Figure 1:
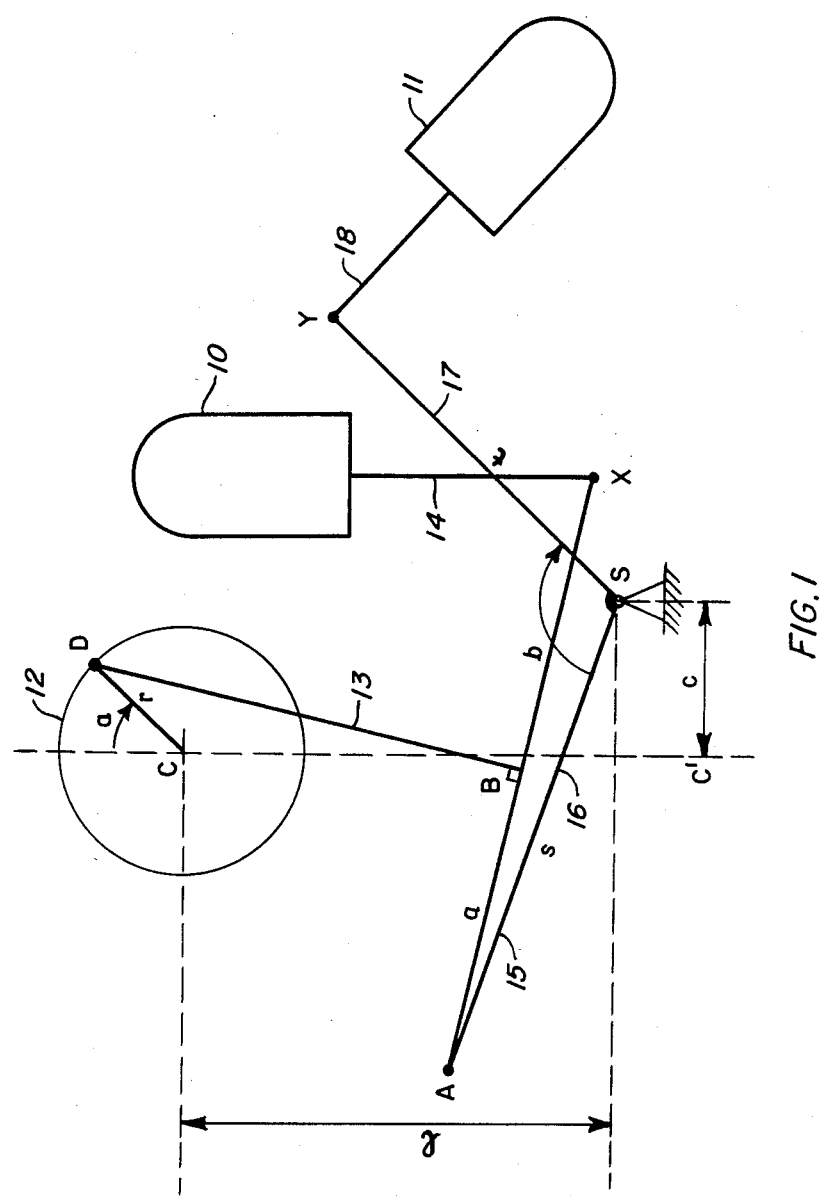

United States Patent [19]

Andersen et al.

[11] Patent Number: 4,596,160
[45] Date of Patent: Jun. 24, 1986

[54] MECHANISM FOR TRANSFERRING MOVEMENTS BETWEEN FIRST AND SECOND LINEARLY DISPLACEABLE BODIES

[75] Inventors: Niels E. Andersen, Hørsholm; Henrik Carlsen, Allerød, both of Denmark

[73] Assignee: AC Energi ApS, Hørsholm, Denmark

[21] Appl. No.: 653,232

[22] PCT Filed: Jan. 16, 1984

[86] PCT No.: PCT/DK84/00004

§ 371 Date: Sep. 13, 1984

§ 102(e) Date: Sep. 13, 1984

[87] PCT Pub. No.: WO84/02757

PCT Pub. Date: Jul. 19, 1984

[30] Foreign Application Priority Data

Jan. 14, 1983 [DK] Denmark ............................. 157/83

[51] Int. Cl.$^4$ ............................................. F16H 21/18
[52] U.S. Cl. ........................................... 74/40; 74/44
[58] Field of Search ...................................... 74/40, 44

[56] References Cited

U.S. PATENT DOCUMENTS

| | | | |
|---|---|---|---|
| 527,356 | 10/1894 | Beaumont et al. | 74/40 |
| 1,039,492 | 9/1912 | Courtwright et al. | |
| 1,597,080 | 8/1926 | Lewis . | |
| 1,612,917 | 1/1927 | Grimes . | |
| 1,673,280 | 6/1928 | Evans | 74/40 |
| 1,793,975 | 2/1931 | St. Clair | 74/40 |
| 1,956,922 | 5/1934 | Ingram | 74/581 |
| 2,590,662 | 3/1952 | Van Weenen . | |
| 4,138,897 | 2/1979 | Ross | 74/45 |

FOREIGN PATENT DOCUMENTS

| | | | |
|---|---|---|---|
| 1201291 | 9/1965 | Fed. Rep. of Germany | 74/40 |
| 605475 | 2/1926 | France . | |
| 878529 | 10/1942 | France . | |
| 29232 | 12/1904 | United Kingdom | 74/40 |
| 383542 | 12/1932 | United Kingdom . | |
| 665735 | 1/1952 | United Kingdom . | |
| 689899 | 4/1953 | United Kingdom . | |

*Primary Examiner*—Lawrence J. Staab
*Attorney, Agent, or Firm*—Dennison, Meserole, Pollack & Scheiner

[57] ABSTRACT

A mechanism for transferring movement between two reciprocating bodies, such as pistons or displacers (10, 11) comprises a crank or eccentric (12) and may be included in a Stirling or Vuilleumier engine. The crank or eccentric is connected to a connecting member (13) by means of a bearing or pivot (D). The connecting member (13) is connected to one (10) of the pistons or displacers via a second pivot (X) and to one arm (16) of a lever (15) by means of a third pivot (A). The pivots (A, D, X) of the connecting member (13) defines the vertices of a triangle. The other arm (17) of the lever (15) is pivotally connected to the other piston or displacer (11).

The arms (16, 17) of the lever (15) may define an angle therebetween, and this angle may be selected so as to obtain a desired angle between the directions of the movements of the pistons, for example an angle of 90°. It is also possible to obtain a desired phase angle between the movements of the pistons and desired lengths of the piston strokes by suitably dimensioning other parts of the mechanism.

14 Claims, 4 Drawing Figures

MECHANISM FOR TRANSFERRING MOVEMENTS BETWEEN FIRST AND SECOND LINEARLY DISPLACEABLE BODIES

The crank mechanisms, which are usually used for transferring forces and movements between pistons in piston engines, such as combustion engines, compressors, etc., are of such a type that the pistons must necessarily be able to transfer substantial transversely directed forces to the walls of the engine cylinders. In certain piston engines this condition is not fulfilled and, therefore, the conventional drive mechanisms including a crank shaft and connecting rods cannot be used. This applies for example to the so-called Stirling and Vuilleumier engines in which it is not possible to use a lubricant for lubricating the inner surfaces of the cylinders. If conventional crank shaft mechanisms are used in connection with such engines it is therefore necessary to include complicated crosshead structures for taking up the transversely directed forces which would otherwise be transferred to the cylinder walls.

From the U.S. Pat. Nos. 1,039,492 and 4,138,897 it is known to insert a triangular connecting link between the cranked part of a shaft or an eccentric and connecting rods of pistons slidably arranged within two adjacent, parallel cylinders of a Stirling engine, whereby no substantial transversely directed forces are applied to the pistons of the engine. However, this known mechanism may only be used in a piston engine having parallel cylinders arranged side by side.

The mechanism according to the invention is of the above described type for transferring movements between first and second linearly displaceable bodies, such as pistons or displacers, and comprising a connecting member having first, second, and third pivots defining first, second and third vertices of a triangle, a rotary device, such as a crank or an eccentric, connected to the first pivot of the connecting member for rotating said first pivot about a fixed axis, the second pivot of the connecting member being connected to said first displaceable body.

The present invention provides a simple mechanism of the above type for transferring movement between a pair of linearly displaceable bodies or pistons without applying substantial transverse forces to these of bodies or pistons even when the pistons are slidably mounted in cylinders arranged in a non-parallel relationship.

The mechanism according to the invention is characterised in further comprising a lever having a fixed fulcrum and having a first arm connected to the third pivot of the connecting member and a second arm pivotally connected to said second, linearly displaceable body.

The cylinders in which the moveable bodies or pistons are mounted may then be arranged so that the axes of the cylinders define a desired angle therebetween, provided that a corresponding angle is defined between the arms of the lever. Furthermore, a desired ratio between the strokes of the two moveable bodies or pistons may be obtained if a similar ratio between the length of the lever arms is chosen. By a suitable dimensioning of the said triangle defined by the pivots of a connecting member it is possible to obtain a desired phase displacement of the movements of the displaceable bodies or pistons as well as desired stroke lengths of the pistons.

The length of the perpendicular of said triangle from the first vertex defined by said first pivot of the connecting member is preferably at least three times the length of the radius of the rotating movement of said first pivot. The movements of the second and third pivots of the connecting member by rotation of the crank or eccentric will then become approximately linear, which is desirable i.e. to avoid that transversely directed forces are applied to the first displaceable body or piston.

The triangle defined by the pivots of the connecting member is preferably an isosceles triangle, and the sides of equal length of the triangle may intersect each other at the first vertex defined by said first pivot. The second and third pivot of the connecting member will then move substantially linearly with substantially the same stroke length.

The mechanism is preferably dimensioned and shaped so as to cause the centre of the side of the triangle subtending the first vertex to be moved substantially along a rectilinear path intersecting the axis of said rotary device and extending parallel to the linear path of movement of said first displaceable body. If the length of the perpendicular of said triangle from the said first vertex is about half the length of the side of the triangle extending between said second and third vertices, the stroke length of the second and third pivots and, consequently, the stroke length of the first body or piston will be $2 \times \sqrt{2}$ times the radius of the rotary device, i.e. the radius of the circular path of said first pivot.

If it is desired to obtain the same stroke for the first and second bodies or pistons, the two arms of the lever should have the same length. The lever arms may be alligned, but they preferably define an angle therebetween, and the displaceable bodies or pistons may then be arranged so as to move in different directions defining any desired angle therebetween. In a preferred embodiment of the mechanism according to the invention the directions of movement of the bodies or pistons define a right angle, which means that the axes of the associated cylinders extend at right angles to each other. This may be advantageous in cases where the cylinder spaces should be interconnected, because the interconnecting passage may then have a relatively short length. Such an arrangement of the cylinders at right angles may be obtained when the lever is shaped so that the lever arms define a right angle therebetween.

When the lever has an angular shape, the connecting member and the lever may be identically shaped so as to obtain a simplified structure.

As explained above, a mechanism according to the invention renders it possible to move the displaceable bodies or pistons or their connecting rods substantially linearly along the respective axes of their corresponding cylinders. However, a smaller component of movement of the pivots at right angle to the axis of the associated cylinder cannot be completely avoided. In order to prevent that such transverse component of movement causes transfer of substantial transverse forces between piston and cylinder, at least one of the linearly displaceable bodies or pistons may be connected to the corresponding pivot via a connecting rod or piston rod, which along at least part of its length is elastically flexible in the plane of the lever or of the connecting member. As an example, part of the length of the piston rod or connecting rod may be in the form of a stiff, flat spring, which may then absorb a minor transverse component of movement.

In principle, the mechanism according to the invention may be used for transferring movements between two pistons or displacer in any piston engine or between two linearly reciprocating bodies.

The mechanism according to the invention may, however, with special advantage be used in connection with Stirling or Vuilleumier engines. In a Vuilleumier engine (cf. U.S. Pat. No. 1,275,507) having cold and warm cylinders in which the pistons or displacer are mounted, the cross-sectional area of the piston rod associated with the cold cylinder may advantageously substantially exceed the cross-sectional area of the piston rod associated with the warm cylinder. The piston rod in the cold cylinder will then function as a piston contributing to drive the engine, because pressure and volume variations in the cold cylinder will then perform a positive work, while the work performed by the piston rod in the warm cylinder is almost zero. Therefore, by the above measures, it is possible to obtain a substantial improvement of the capacity and efficiency of the engine.

Figure 2:
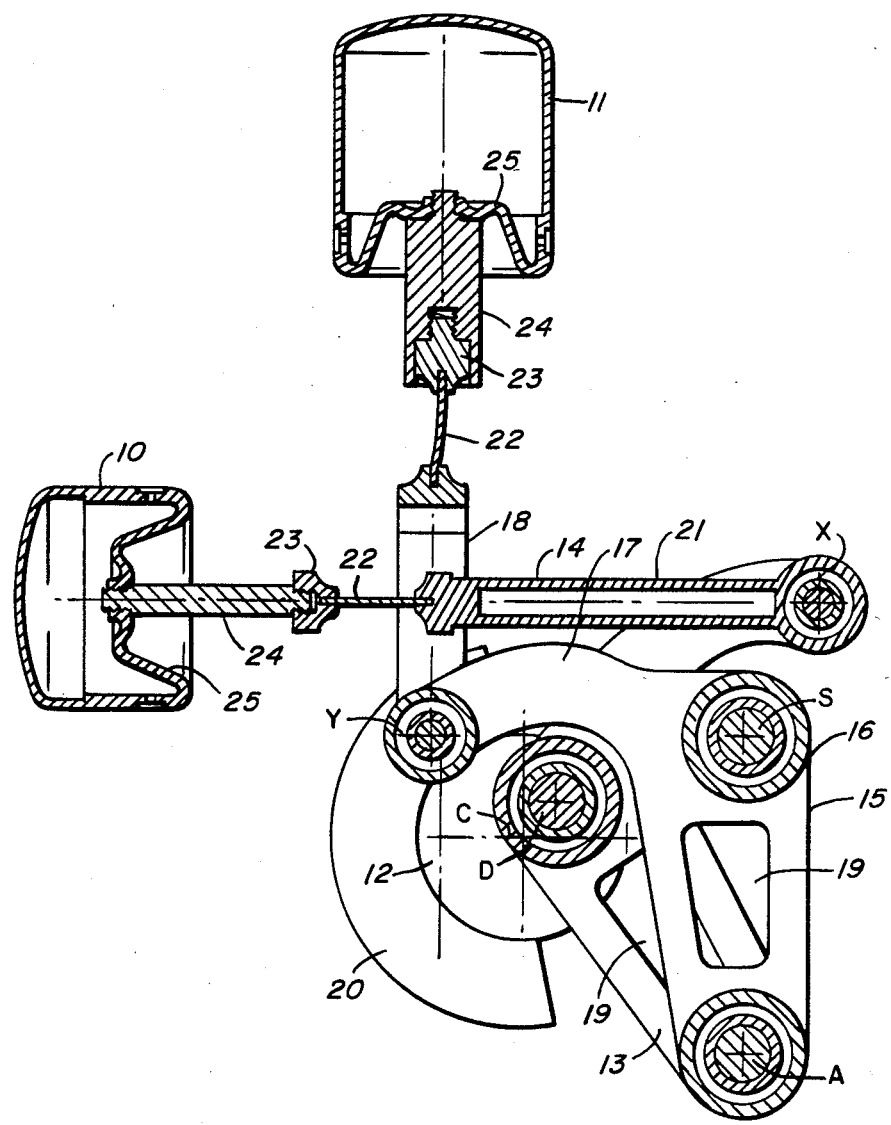
Figure 3:
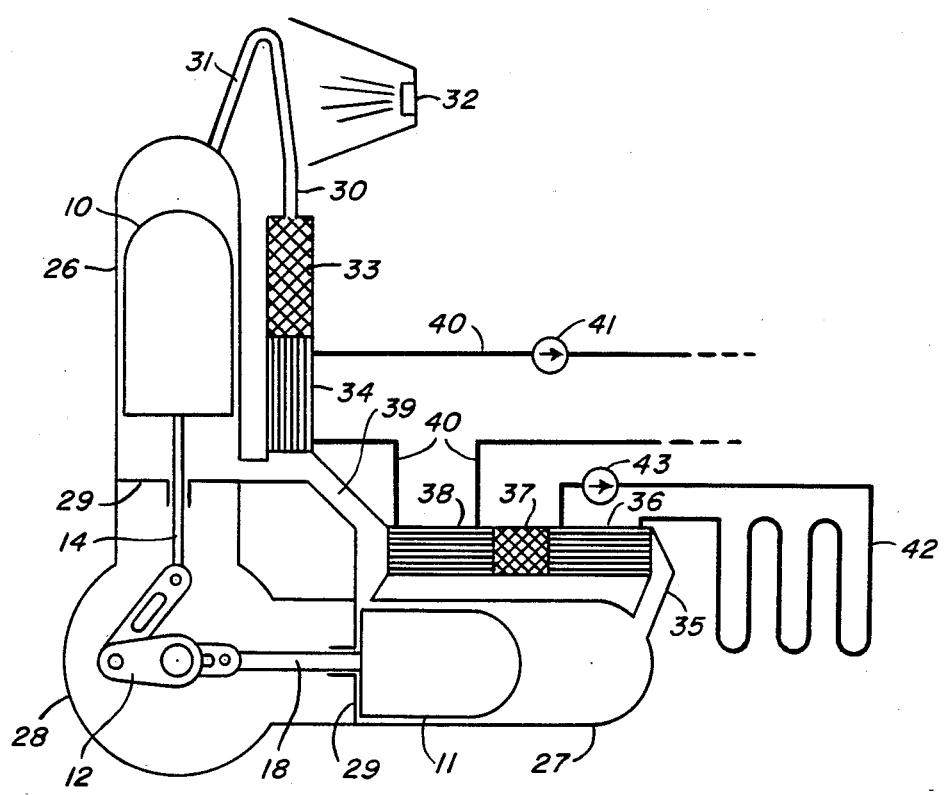
Figure 4:
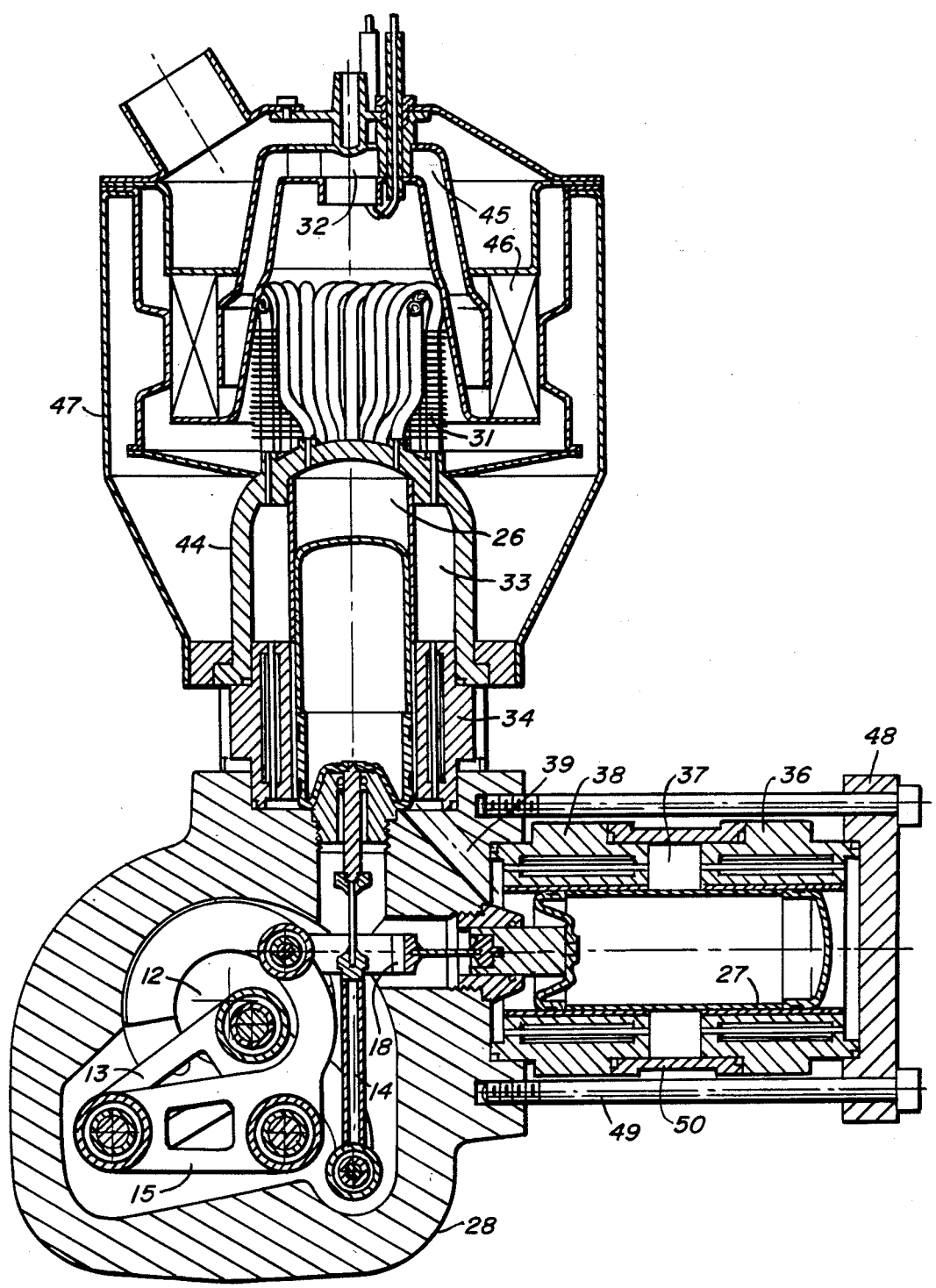

The invention will now be further explained with reference to the drawings, wherein FIG. 1 diagrammatically illustrates an embodiment of the mechanism according to the invention, FIG. 2 is sectional view of another embodiment of the mechanism according to the invention, FIG. 3 diagrammatically illustrates a Vuilleumier engine functioning as a heat driven heat pump, and FIG. 4 is a sectional view of an engine as that shown in FIG. 3 and including a mechanism according to the invention.

FIG. 1 diagrammatically illustrates the principle of the mechanism of the invention for transferring movements between two pistons or displacers 10 and 11. The mechanism comprises a cranked portion of a shaft or an eccentric 12 which may rotate about a fixed centre or centre axis C with a radius r. A connecting element 13 is provided with three pivots or bearings A, D and X defining the vertices of a triangle. The cranked portion or eccentric 12 is connected to the connecting member 13 at the pivot or bearing D, while the pivot or bearing X interconnects the connecting member and a piston rod 14 of the piston or displacer 10. In the triangle defined by the pivots A, D, and X the perpendicular extending from the vertex D intersects the side AX of the triangle at a point designated by B, and the lengths of the line segments AB, BX and BD are designated a, b, and d, respectively. A lever 15 has a fixed fulcrum S and two arms 16 and 17 having the lengths s and t, respectively. The lever arms 16 and 17 define an angle therebetween designated by $\beta$. The free end of the lever arm 16 is connected to the connecting member 13 by the pivot A, while the free end of the lever arm 17 is connected to a piston rod 18 of the piston 11 by means of a pivot Y. A line extending through the centre C of the cranked portion and parallel with the direction of movement of the piston 10 is designated CC', and the distance between this line and the fulcrum S is designated by c. Finally, the distance between the centre C and the fulcrum S of the lever is designated by l.

When the cranked portion or the eccentric 12 is rotated, the pistons or displacer 10 and 11 are reciprocated in their associated cylinders, not shown. Conversely, the cranked portion 12 is rotated if the pistons or displacers 10 and 11 are caused to reciprocate. Assuming that the lever 15 is shaped and arranged so that the point B moves substantially along the line CC' when the cranked portion 12 is rotated, the pivots A and X will reciprocate along lines which are substantially parallel to the line CC' and move with a mutual phase displacement, which is dependent on the lengths a, b, and d in relation to the radius r of the cranked portion.

The fulcrum S of the lever 15 may, for example, be placed so that c=s−a, and l=d. The pivots X and A will then move equal distances above and below the dotted line extending through the fulcrum S and at right angles to the line CC' in FIG. 1.

Assuming that the movements of the pivots A and X may be considered linear—which may in practice be considered the case when d exceeds 3×r—the mutual phase angle $\alpha_f$ for the movements of the pivots A and X may be expressed as the sum of the phase angles $\alpha_A$ and $\alpha_X$ of the pivots, which means that $$\alpha_f = \alpha_X + \alpha_A,$$

wherein $tg\alpha_X = b/d$, and $tg\alpha_A = a/d$.

From the above equations it is seen that the phase angle between the movements of the pivots A and X will decrease if the length d of the line segment BD increases, while an increase of the lengths a and b will cause an increase of the phase angle. If, for example, $a = b = d$, the phase angle $\alpha_f = 90°$.

Furthermore, the length of the stroke of the linear movements of the pivots A and X is proportional to the value of b/d and a/d, respectively. If $a=b=d$, the half stroke length x for each of the pivots may be expressed as $x = \sqrt{2} \times r$.

From FIG. 1 it is seen that a desired angle between the directions of movement of the pistons 10 and 11 or between the longitudinal axes of the associated cylinders may be obtained by changing the angle $\beta$ between the lever arms 16 and 17 without thereby changing the phase angle between the movements of the pivots A and X and, consequently, between the movements of the pistons 10 and 11. Furthermore, it is possible to freely choose the length of the stroke of the piston 11 by selecting a suitable ratio between the lengths s and t of the lever arms 16 and 17. If the angle $\beta = 90°$, the directions of movement of the pistons 10 and 11 extend at mutually right angles. The forces of enertia generated by the movements of the pistons may then be balanced by mounting a balance weight on the cranked portion 12 at such a position that the balance weight is in a top position when the angle of the cranked portion $\alpha = 135°$.

FIG. 2 shows an embodiment of the mechanism according to the invention, wherein $a = b = d = \sqrt{2}/2 \times t = \sqrt{2}/2 \times s$, and wherein $\beta = 90°$. The connecting member 13 and the lever 15 may then have identical shapes. The structure shown in FIG. 2 will now be further described, and parts in FIG. 2 corresponding to parts in FIG. 1 are designated by the same references.

In the embodiment shown in FIG. 2 the connecting member 13 as well as the lever 15 are formed as an angle member provided with an opening or a cutout 19 in order to reduce the weight of the moving masses. The cranked portion 12 is provided with a balance weight 20, and each of the piston rods 14 and 18 are divided into three portions. Thus, each of these piston rods consists of an inner rod portion 21 having its outer free end connected to a middle portion 22 in the form of a flat spring. The outer end of the spring is fastened to a mounting portion 23, which is screwed into an outer solid rod portion 24, which is in turn screwed into a bottom portion 25 of the corresponding piston. As shown in FIG. 2, the outer rod portion 24 connected to the piston 11 preferably has a cross-sectional area which is substantially greater than that of the outer rod portion, which is connected to the piston 10. When the mechanism described above is used in a heat pumpe of the type functioning in accordance with the Vuilleumier process, these features give rise to an improved capacity and efficiency of the heat pump as previously described. The cross-sectional area of the outer rod portion 24 connected to the piston in the warm cylinder is preferably made as small as possible, while the corresponding rod portion, which is connected to the piston in the cold cylinder, is dimensioned so that the heat pump is driven with the desired rotational speed. The diameter of the rod portion associated with the cold cylinder is typically two-five times the diameter of the piston rod associated with the warm cylinder.

As mentioned above in connection with the explanation of FIG. 1, the components of movement of the pivots X and Y in a direction at right angles to the direction of movement of the associated pistons 10 and 11, respectively, will be very small, and typically less than 10% of the length of the respective piston stroke. In the embodiment shown in FIG. 2 this small transverse component of movement may be absorbed by the flat springs 22. Consequently, transversely directed forces between the pistons 10 and 11 and the associated cylinders is eliminated without using crosshead guides or other guide structures. The elimination of transversely directed forces between the pistons and cylinders is of substantial importance when the mechanism is used in Stirling and Vuilleumier engines, wherein the pistons are normally provided with lubrication-free sealing rings made from plastic.

FIG. 3 diagrammatically illustrates the principle at a Vuilleumier engine. This engine comprises a piston or displacer 10 displaceably arranged within a cylinder 26, and a piston or displacer 11 displaceably arranged within a cylinder 27 with a longitudinal axis extending at right angles to the longitudinal axis of the cylinder 26. The cylinders 26 and 27 are separated from a crank case 28 by means of transverse walls 28 having openings therein sealingly receiving piston rods 14 and 18 associated with the displacer 10 and 11, respectively. Thus, the displacer 10 divides the inner space of the cylinder 26 into two compartments located at either end of the displacer and interconnected by means of a connecting passage 30, including a heater 31 with a burner 32, a regenerator 33, and a cooler 34. The displacer 11 correspondingly divides the inner space of the other cylinder 27 into two cylinder chambers, which are interconnected by means of a connecting passage 35, which includes a heater 36, a regenerator 37, and a cooler 38. The cylinder spaces or chambers located adjacent to the crank case 28 are interconnected by means of a connecting passage 39.

As indicated in FIG. 3, the coolers 34 and 38 may form part of the conduit system 40 of a central heating plant comprising a circulating pump 41 for circulating a heat transferring medium in the conduit system. The heater 36 may be included in a conduit system, which comprises an underground conduit 42, and in which a heat transfer medium may be circulated by means of a circulating pump 43. The regenerators 33 and 37 may consist of a porous material, which take up and give off heat, when warm and cold gas, respectively, alternatingly flow therethrough.

The piston rods 14 and 18 are interconnected by means of a mechanism as that described above with reference to FIG. 2. When the cranked portion 12 is rotated, the displacer 10 performs a reciprocating movement which is phase displaced 90° in advance of the reciprocating movement of the displacer 11, i.e. the displacer 10 is moved to its top position 90° in advance of the displacer 11.

The Vuilleumier engine shown in FIG. 3 may operate as a heating pump as heat is transferred to the heat transfer medium within the conduit system 40 via the coolers 34 and 38, and the conduit system 40 may form part of a central heating plant or be used for any other heating purpose. The engine illustrated in FIG. 3 operates as follows:

If the volumes occupied by the piston rods 14 and 18 in the cylinder chambers adjacent to the crank case 28 are ignored, the total volume of these interconnected chambers in the cylinders 26 and 27 will be constant despite the positions of the displacers within the cylinders. In the heater 31 the gas circulating in the Vuilleumier engine is heated to a higher temperature, such as about 700° C., and the gas is cooled, for example to about 50° C., when it passes the regenerator 33 and the cooler 34 in the connecting passage. Consequently, the gas located above the displacer 10 within the cylinder 26 will have a high temperature of about 700° C., while the gas located in the cylinder 26 below the displacer 10 and in the cylinder 27 below the displacer 11 will have a temperature of about 50° C. When the gas flows through the connecting passage 35 and into the chamber above the displacer 11 in the cylinder 27, the gas is cooled by the regenerator 37 and the heater 36 to a relatively low temperature which may, for example, be about 0° C. The ratio between the amount of gas present above the displacer 10 at high temperature and the amount of gas present within the cylinder 27 and below the displacer 10 at low temperature will change when the crank mechanism is moved. As the total cylinder volume is substantially constant as mentioned above, this means that the pressure conditions within the cylinders 26 and 27 will change with the movements of the pistons or displacers.

When the gas, such as helium, circulating in the conduit system of the engine is heated by means of the burner 32, and the displacers 10 and 11 are moved by means of the previously described crank mechanism so that the displacer 10 is moved 90° in advance of the displacer 11, this movement will result in a generation of positive work, because heat is supplied not only from the burner 32 via the heater, but also from the underground conduit 42. This means that the engine shown in FIG. 3 may be used as a heat pump driven by primary energy. The engine may be driven by means of an electric motor, but it has been found that the engine may operate without such assisting driving means if the cross-sections of the piston rods 14 and 18 are suitably dimensioned, apart from start of the engine. The diameter of the piston rod 18 associated with the "cold" cylinder 27 may suitably have a diameter which is two-four times the diameter of the piston rod 14 associated with the "warm" cylinder 26.

FIG. 4 shows more in detail a Vuilleumier heat pump as that diagrammatically illustrated in FIG. 3, and the parts of the structure shown in FIG. 4 corresponding to parts shown in FIGS. 1–3 are designated by the same reference numerals.

In the embodiment shown in FIG. 4 the heater 31 and the associated burner 32 are arranged on a cylinder head 44, which closes the outer end of the "warm" cylinder 26 and surrounds the regenerator 33, which has an annular shape and is arranged around the cylinder 26. Combustion air is supplied to the burner 32 through a passage system 45 comprising a preheater 46, and the heater 31 as well as the cylinder head 44 is surrounded by an outer jacket 47.

The heater 36, the regenerator 37, and the cooler 38 associated with the "cold" cylinder 27 are annular and arranged around the cylinder 27. These annular parts are retained in position by means of a cylinder head 48 which are fastened to the crank case 28 by means of long screws 49, and an outer cylindrical jacket 50 surrounding the regenerator 37 is clamped between the heater 36 and the cooler 38 and functions as a spacing member.

The crank mechanism of the engine shown in FIG. 4 corresponds completely to that described above with reference to FIG. 2. As explained above, this crank mechanism allows the cylinders 26 and 27 to be arranged with their longitudinal axes extending at right angles, and as seen from FIG. 4 this arrangement of the cylinders renders it possible to use a relatively short connecting passage 38 and to make the engine substantially more compact than in case where the cylinders are arranged parallel in side by side relationship.

While the invention has been described in detail above in relation to a Vuilleumier engine, it should be understood that the mechanism according to the invention could also advantageously be used in connection with Stirling engines and in all other cases where two pistons or displacers or other kinds of reciprocating elements should be interconnected so that they are forced to move with a desired mutual phase displacement.

We claim:

1. A mechanism for transferring movements between first and second linearly displaceable bodies, such as pistons or displacers, said mechanism comprising a connecting member having first, second and third pivots defining first, second and third vertices of a triangle with fixed side lengths, a rotary device, such as a crank or an eccentric, connected to the first pivot of the connecting member for rotating said first pivot about a fixed axis, the second pivot of the connecting member being connected to said first displaceable body through an elongated body connector, and a two-armed lever having a fixed fulcrum and having a first arm connected directly to the connecting member by said third pivot and a second arm pivotally connected to said second, linearly displaceable body through a second elongated body connector.

2. A mechanism according to claim 1, wherein the length of the perpendicular of said triangle from the first vertex defined by said first pivot of the connecting member is at least three times the length of the radius of the rotating movement of said first pivot.

3. A mechanism according to claim 1, wherein the triangle defined by the pivots of the connecting member is an isosceles triangle, the sides of equal length of the triangle meeting at the first vertex defined by said first pivot.

4. A mechanism according to claim 3, which is dimensioned so as to cause the centre of the side of the triangle subtending said first vertex to be moved substantially along a rectilinear path intersecting the axis of said rotary device and extending parallel to the linear path of movement of said first displaceable body.

5. A mechanism according to claim 3, wherein the length of the perpendicular of said triangle from the said first vertex is about half the length of the side of the triangle extending between said second and third vertices.

6. A mechanism according to claim 1, wherein the arms of the lever define an angle therebetween.

7. A mechanism according to claim 6, wherein the angle defined between the lever arms is a right angle.

8. A mechanism according to claim 1, wherein the arms of the lever are of equal length.

9. A mechanism according to claim 6, wherein the connecting member and the lever are identically shaped.

10. A mechanism according to claim 1, wherein at least one of the first and second body connectors is elastically flexible in the plane of the lever or of the connecting member along at least part of its length.

11. A mechanism according to claim 10, wherein at least part of the length of the body connector is formed by a stiff, flat spring.

12. A mechanism according to claim 1, which forms part of a Vuilleumier engine.

13. A mechanism according to claim 12, which forms part of a Vuilleumier engine having a cold and a warm cylinder in which the displaceable bodies in the form of pistons are mounted, the piston mounted in the cold cylinder having a piston rod portion adjacent to the piston with a cross-sectional area substantially exceeding the cross-sectional area of a piston rod portion connected to the piston in the warm cylinder.

14. A mechanism according to claim 1, which forms part of a Stirling engine.

* * * * *